3,107,203
STREPTOKINASE PURIFICATION PROCESS
Werner Baumgarten, North Hills, and Rose B. Cole, Philadelphia, Pa., assignors to Merck & Co., Inc., Rahway, N.J., a corporation of New Jersey
No Drawing. Filed Nov. 24, 1961, Ser. No. 154,837
1 Claim. (Cl. 195—66)

This invention is concerned with the preparation of streptokinase and particularly with a method of purification of crude streptokinase.

Streptokinase is a fermentation product of hemolytic streptococci. It was established sometime ago that it plays a role in the dissolution of blood clots and particularly of exudates which are rich in fibrin components. Depending on the nature and size of these clots, streptokinase or streptokinase in the presence of human plasminogen effects the dissolution of such clots. Heretofore, the use of streptokinase (and plasmin prepared from plasminogen and streptokinase) has been limited due to the fact that streptokinase has been contaminated with streptococcal protein by-products which gave rise to toxic reactions in man. These reactions manifest themselves by increase in body temperature, fall in blood pressure, shaking, chills, anoxia, cyanosis, and the like.

A feature of the present invention is that it is now possible to eliminate the contaminating proteins from the streptokinase preparation and to obtain a highly purified streptokinase. Our invention relates mainly to the methods involved in this purification. The consequent availability of highly purified streptokinase makes it possible to treat patients indiscriminately with streptokinase or with streptokinase activated plasminogen. This treatment has been found to be of unique importance in the treatment of a variety of diseases such as thrombophlebitis, phlebothrombosis, pulmonary embolism, coronary thrombosis, cerebral thrombosis, and the like.

The crude streptokinase which is purified in accordance with our invention, may be obtained by known procedures. In general this is accomplished by using *Streptococcus hemolyticus* as an inoculum on a growth medium and allowing bacterial growth to proceed for 8–10 hours. At that time, fermentation is stopped by passing the broth through cooling coils and the bacterial cells are removed by centrifugation or by filtration. The streptokinase may be isolated from the broth by any known method. Usually, material isolated in this manner is from 15 to 60% pure as judged by physical methods of homogeneity. The present invention is concerned with the final purification of this partially purified product. This purification is accomplished by column or batch chromatography on DEAE-Sephadex, an ion exchange resin. DEAE-Sephadex is a new ion exchange material, which may be characterized as the diethylaminoethyl ether of Sephadex, prepared by the introduction of diethylaminoethyl groups into Sephadex. Sephadex consists of small grains of a hydrophilic insoluble substance made by cross-linking the polysaccharide, dextran. It is commercially available through Pharmacia of Uppsala, Sweden, and also through their U.S. branch in Rochester, Minnesota.

In our invention, we employed a phosphate buffer gradient for the elution of streptokinase. Generally speaking streptokinase in a phosphate buffer of low strength is adsorbed on the resin and thereafter is eluted by increasing the ionic strength of the buffer. Many of the impurities are adsorbed at the low ionic strength and are firmly bound to the resin so that the resulting streptokinase eluate solution is free of these substances. Other contaminants are not adsorbed to any extent and are found in the effluent.

By correctly choosing the phosphate buffer concentrations and the appropriate fraction, it is possible to obtain in excellent yield and in a simple manner, a highly purified streptokinase which has high therapeutic efficacy and is free of contamniants producing side reactions. Any commonly used phosphate buffer may be employed but it is preferable to use potassium phosphate. To have the streptokinase asborbed on the Sephadex resin it should be in a phosphate buffer having a molar concentration between 0.02 and 0.04 preferably about 0.030. To remove impurities from the resin, a phosphate buffer should be used which is within the molar concentration of 0.03 to 0.08. To elute the streptokinase a phosphate buffer having a molar concentration which is within the range of 0.10 to 0.15 should be used. Fractions having a molar concentration of from 0.10 to 0.14 will be found to have the most amounts of streptokinase.

A most suitable procedure for carrying out the above treatment of the resin with phosphate buffers of increasing strength is to flow through the column a phosphate buffer which has an initial molar concentration of 0.03 and to which is gradually added and mixed a phosphate buffer having a molar concentration of 0.2 or higher. In this way the molar concentration of the eluting buffer is continuously increased. The portion which passes through the column up to a molar concentration of 0.09 is discarded and the portion having a molar concentration above 0.10 and up to 0.15 is collected. Instead of the use of such a continuously increasing molar concentration, it is possible to successively wash the resin with separate buffers of increasing molar strength. For example, a first wash may be with a 0.03 M solution, then with a 0.04 M and then with a 0.06 M buffer followed by 0.08 M all of which will be discarded. The next higher molar concentrations, 0.10 M, 0.12 M, 0.14 M will be collected as they will contain the highest amounts of streptokinase.

Some streptokinase will be found in the first eluting buffer of 0.08 M, and consequently a second wash at this same molar concentration may be carried out and collected as it will have an appreciable amount of streptokinase in it. Or it is possible to remove the impurities with a single buffer of 0.08 M concentration and to collect the streptokinase with a single buffer of say 0.14 M concentration although the yield of streptokinase will be relatively lower.

In the following examples DEAE-Sephadex A–50 has been employed, however, DEAE-Sephadex A–25 can be substituted with similar results.

The invention will be clarified by the following examples:

EXAMPLE I

The example illustrates the purification of crude streptokinase by chromatography on DEAE-Sephadex resin A–50.

The DEAE-Sephadex is suspended in the 0.03 M phosphate buffer and is agitated and allowed to settle several times to remove the fines. It is essential that the fines be removed in order to prepare columns with a suitable flow rate. The column described in this writeup has a flow of approximately 500 ml./hr. It is very desirable to stir up the column immediately before use in order to prevent separation of the solid from the glass surface.

A column 30 cm. long with an inside diameter of 52 mm. is charged with DEAE-Sephadex suspended in 0.03 M phosphate buffer. Enough DEAE-Sephadex is added so that after settling a column of 6–7 cm. is formed.

The crude streptokinase solution is dialyzed against a phosphate buffer with the following composition (.02–0.04, preferably 0.03 M):

Monobasic potassium phosphate, $KH_2PO_4$, 27.2 g./liter—Sol. A.

Dibasic potassium phosphate, $K_2HPO_4$, 34.8 g./liter—Sol. B.

16 ml. of A, 84 ml. of B to yield a 0.2 M phosphate buffer, pH 7.5. This is then diluted to 0.03 M phosphate.

After equilibrium has been established, the streptokinase material is ready for purification, which can be judged by measuring the electric resistance of the solution.

The streptokinase to be absorbed on the resin may be obtained commercially. The streptokinase, in a concentration of $10^6$ units ml. or a total of $100 \times 10^6$ units dissolved in 100 ml. of water, is dialyzed for 16–18 hours at 3° C. against two liters of 0.03 M phosphate buffer, pH 7.5. With the molarity of the effluent of .10 and .14 the major portion of streptokinase of high purity is eluted and appears in the effluent (see Table 1). The fractions are assayed for streptokinase content and for protein and the purity of the individual fractions are determined by calculating the specific activity. The streptokinase rich fractions may be lyophilized or may be employed for conversion of plasminogen into plasmin.

Table 1

PURIFICATION OF STREPTOKINASE BY CHROMATOGRAPHY ON DEAE-SEPHADEX RESINS

Conditions:
  Adsorption—DEAE-Sephadex at 0.03 M potassium phosphate, pH 7.6
  Elution—Potassium phosphate, pH 7.6, stepwise

| Fraction | Elution molarity | Streptokinase units/fraction | Percent of total | Purity units/optical density at 280 m$\mu$ |
|---|---|---|---|---|
| Starting material | | $59 \times 10^5$ | 100 | $34 \times 10^3$ |
| 7 | .08 | $2.9 \times 10^5$ | 4.9 | $54 \times 10^3$ |
| 8 | .08 | $5.7 \times 10^5$ | 9.6 | $87 \times 10^3$ |
| 9 | .10 | $7.2 \times 10^5$ | 12.2 | $94 \times 10^3$ |
| 10 | .10 | $9.6 \times 10^5$ | 16.2 | $123 \times 10^3$ |
| 11 | .12 | $9.8 \times 10^5$ | 16.6 | $112 \times 10^3$ |
| 12 | .12 | $10.4 \times 10^5$ | 17.6 | $108 \times 10^3$ |
| 13 | .14 | $7.7 \times 10^5$ | 13.0 | $86 \times 10^3$ |
| 14 | .14 | $6.5 \times 10^5$ | 13.0 | $86 \times 10^3$ |
| 15 | .16 | $4.0 \times 10^5$ | 6.7 | $72 \times 10^3$ |
| 16 | .16 | $3.2 \times 10^5$ | 5.4 | $68 \times 10^3$ |

EXAMPLE II

A DEAE-Sephadex column is prepared as in Example I and the resin is equilibrated with 0.08–0.12 M phosphate buffer, preferably .1 M. The crude streptokinase is dialyzed against 0.08–0.12 M phosphate buffer preferably 0.1 M. After equilibrium has been established, the streptokinase is introduced onto the column. Most of the impurities are retained on the column while the streptokinase solution appears in the effluent. The column is washed with 0.08–0.12 M phosphate buffer, preferably .1 M. The column is washed with this buffer again and the major portion of streptokinase is recovered in the effluent. It may then be used as given in Example I.

What is claimed is:

The method of purifying streptokinase which comprises bringing into contact with a cross-linked dextran selected from the group consisting of DEAE-Sephadex A–25 and DEAE-Sephadex A–50, a solution of streptokinase in a phosphate buffer having a molar concentration no greater than 0.04, washing with a phosphate buffer having a molar concentration between 0.04 and 0.10 to remove impurities, and removing streptokinase from the DEAE-Sephadex with a phosphate buffer having a molar concentration between 0.10 and 0.15.

References Cited in the file of this patent

UNITED STATES PATENTS 2,997,425    Singher et al. _____ Aug. 22, 1961

OTHER REFERENCES

Porath et al.: Nature, vol. 191, pages 69–70 (July 1961).

Flodin et al.: Nature, vol. 188, pages 493–494 (Nov. 5, 1960).

Porath: Biochimica et Biophysica Acta, vol. 39, pages 193–207 (1959).